US009835285B1

(12) United States Patent
Hurley

(10) Patent No.: US 9,835,285 B1
(45) Date of Patent: *Dec. 5, 2017

(54) PIVOTING SUPPORT ASSEMBLY

(71) Applicant: Lyndon J. Hurley, Harrisburg, SD (US)

(72) Inventor: Lyndon J. Hurley, Harrisburg, SD (US)

(73) Assignee: Hurco Technologies, Inc., Harrisburg, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/220,527

(22) Filed: Jul. 27, 2016

Related U.S. Application Data

(63) Continuation-in-part of application No. 15/018,522, filed on Feb. 8, 2016, now Pat. No. 9,719,630.

(51) Int. Cl.
| | |
|---|---|
| *F16M 1/00* | (2006.01) |
| *F16M 11/20* | (2006.01) |
| *F16M 13/02* | (2006.01) |
| *F16M 11/06* | (2006.01) |
| *F16M 11/18* | (2006.01) |

(52) U.S. Cl.
CPC ......... *F16M 11/2007* (2013.01); *F16M 11/06* (2013.01); *F16M 11/18* (2013.01); *F16M 13/02* (2013.01); *F16M 2200/021* (2013.01); *F16M 2200/068* (2013.01)

(58) Field of Classification Search
CPC ............ F16M 13/02; F16M 2200/021; F16M 2200/06; F16C 11/10
USPC ........................... 248/647; 137/899; 702/114
See application file for complete search history.

(56) References Cited

U.S. PATENT DOCUMENTS

| | | | |
|---|---|---|---|
| 1,979,340 | A | 11/1934 | Norman |
| 2,214,389 | A | 9/1940 | Wahlmark |
| 2,548,146 | A | 4/1951 | Ferris |
| 2,548,147 | A | 4/1951 | Ferris |
| 2,746,720 | A | 5/1956 | Cannon |

(Continued)

FOREIGN PATENT DOCUMENTS

EP          089412          9/1983

OTHER PUBLICATIONS

The Wachs Company, "Automated Valve Operating Systems", pp. 1-6.

(Continued)

*Primary Examiner* — Gwendolyn Baxter
(74) *Attorney, Agent, or Firm* — Jeffrey A. Proehl; Woods, Fuller, Shultz & Smith P.C.

(57) ABSTRACT

A pivoting support assembly with a selective position locking capability may comprise a base, a first support arm movable with respect to the base, a first pivot joint pivotally mounting the first support arm to the base, and a first position locking assembly configured to lock a selected position of the first support arm with respect to the base. The first position locking assembly may comprise a first hydraulic motor mounted on the first pivot joint and having a fluid input and a fluid output with a fluid path defined therebetween such that fluid movement on the fluid path between the fluid input and the fluid output operates the first hydraulic motor. The first position locking assembly may comprise a first lock valve in communication with the first hydraulic motor and configured to selectively block fluid movement through the fluid path of the motor.

17 Claims, 14 Drawing Sheets

(56) References Cited

U.S. PATENT DOCUMENTS

| | | |
|---|---|---|
| 3,093,946 A | 6/1963 | Pitt |
| 3,216,511 A | 11/1965 | Ladd |
| 3,417,953 A | 12/1968 | Hillquist |
| 3,565,372 A | 2/1971 | Jones |
| 3,572,380 A | 3/1971 | Jackson |
| 4,063,359 A | 12/1977 | Luscombe |
| 4,080,530 A | 3/1978 | Krogsrud |
| 4,089,448 A | 5/1978 | Traeger |
| 4,114,426 A | 9/1978 | McClean |
| 4,166,692 A | 9/1979 | Nilsen |
| 4,174,733 A | 11/1979 | Eidsmore |
| 4,183,489 A | 1/1980 | Copher |
| 4,278,864 A | 7/1981 | DeFacci |
| 4,463,858 A | 8/1984 | Bilas |
| 4,478,041 A | 10/1984 | Pollman |
| 4,481,770 A | 11/1984 | Lohbauer |
| 4,523,286 A | 6/1985 | Koga |
| 4,561,459 A | 12/1985 | Jackman |
| 4,600,364 A | 7/1986 | Nakatani |
| 4,883,249 A | 11/1989 | Garland |
| 4,961,471 A | 10/1990 | Ovens |
| 4,987,690 A | 1/1991 | Aaldenberg |
| 5,299,770 A | 4/1994 | Sayles |
| 5,330,014 A | 7/1994 | Wagner |
| 5,373,978 A | 12/1994 | Buttchen |
| 5,381,996 A | 1/1995 | Arnemann |
| 5,398,721 A | 3/1995 | Pryor |
| 5,503,423 A | 4/1996 | Roberts |
| 5,540,006 A | 7/1996 | Lloyd |
| 5,560,130 A | 10/1996 | Bapst |
| 5,730,345 A | 3/1998 | Yeckley |
| 5,746,404 A | 5/1998 | Merko |
| 5,775,560 A | 7/1998 | Zahn |
| 5,809,779 A | 9/1998 | Bruso |
| 5,810,051 A | 9/1998 | Champagna |
| 5,876,005 A | 3/1999 | Vasconi |
| 5,937,373 A | 8/1999 | Ferrar |
| 6,009,905 A | 1/2000 | Arnemann |
| 6,056,065 A | 5/2000 | Campbell |
| 6,087,945 A | 7/2000 | Yasuda |
| 6,125,868 A | 10/2000 | Murphy |
| 6,129,371 A | 10/2000 | Powell |
| 6,131,391 A | 10/2000 | Poorman |
| 6,142,180 A | 11/2000 | Woodling |
| 6,478,528 B1 | 11/2002 | Asbury |
| 6,550,734 B1 | 4/2003 | Spadea |
| 6,701,913 B1 | 3/2004 | Leduc |
| 6,821,075 B2 | 11/2004 | Van Der Horn |
| 7,017,406 B1 | 3/2006 | Cressman |
| 7,334,606 B1 | 2/2008 | Hurley |
| 7,376,529 B1 | 5/2008 | Hurley |
| 7,415,376 B1 | 8/2008 | Hurley |
| 7,455,124 B1 | 11/2008 | Hurley |
| 7,607,624 B1 | 10/2009 | Hurley |
| 7,917,324 B2 | 3/2011 | Hurley |
| 7,987,923 B1 | 8/2011 | Hurley |
| 8,025,078 B2 | 9/2011 | Ferrar |
| 8,365,838 B2 | 2/2013 | Hurley |
| 2001/0053970 A1 | 12/2001 | Ford |
| 2003/0155390 A1 | 8/2003 | Williams |
| 2005/0075817 A1 | 4/2005 | Kah |
| 2005/0076965 A1 | 4/2005 | Buckner |
| 2005/0166350 A1 | 8/2005 | Buckner |
| 2005/0222933 A1 | 10/2005 | Wesby |
| 2008/0255770 A1 | 10/2008 | Hurley |
| 2008/0281534 A1 | 11/2008 | Hurley |
| 2009/0319572 A1 | 12/2009 | Bernard |
| 2017/0079743 A1* | 3/2017 | Tao ........................ F16M 13/02 |
| 2017/0150018 A1* | 5/2017 | Luoma ................ H04N 5/2253 |
| 2017/0150817 A1* | 6/2017 | Hung ................... A47B 97/001 |

OTHER PUBLICATIONS

E.H. Wachs Companies, "Truck Mounted Valve Operator Model TM-7", Product Manual, Jan. 2004, pp. 1-55.

E.H. Wachs Companies, "Wachs ValveCard 1.2", Product Manual, Sep. 1998, pp. 1-26.

Holden & Brook Limited, Packaged Fire Hydrant Pump Sets, Brochure, Apr. 1989, pp. 1-4, Manchester, England.

Macarena Cavestany Olivares, "Characterization of Irrigation Hydrants and Influence of Their Wrong Behavior on the Performance of an Irrigation Network", Aug. 23, 2006, pp. 1-90.

Telog Instruments, Hydrant Pressure Monitoring, brochure, available at www.telog.com/flash/downloads/hpr_suite.pdf.

National Fire Protection Association, "Recommended Practice for Fire Flow Testing and Marking of Hydrants", 2002 Edition, 18 pages.

Exhibit A: Invoice of Hurco Technologies dated Jul. 23, 2002.
Exhibit B: Photograph of Prototype invoiced on Jul. 23, 2002.
Exhibit C: Photograph of Prototype invoiced on Jul. 23, 2002.
Exhibit D: Photograph of Prototype invoiced on Jul. 23, 2002.
Exhibit E: Photograph of Prototype invoiced on Jul. 23, 2002.
Eskridge, Repair Kits for Series 93 Brakes, drawing, date unknown.

* cited by examiner

PIVOTING SUPPORT ASSEMBLY

REFERENCE TO RELATED APPLICATIONS

This application is a continuation-in-part of U.S. patent application Ser. No. 15/018,522, filed Feb. 8, 2016, which is hereby incorporated by reference in its entirety.

BACKGROUND

Field

The present disclosure relates to supports and more particularly pertains to a new pivoting support assembly for providing a pivotable support that is selectively lockable in a variety of positions.

SUMMARY

The present disclosure relates to a pivoting support assembly with a selective position locking capability may comprise a base, a first support arm movable with respect to the base, a first pivot joint pivotally mounting the first support arm to the base, and a first position locking assembly configured to lock a selected position of the first support arm with respect to the base. The first position locking assembly may comprise a first hydraulic motor mounted on the first pivot joint and having a fluid input and a fluid output with a fluid path defined therebetween such that fluid movement on the fluid path between the fluid input and the fluid output operates the first hydraulic motor. The first position locking assembly may comprise a first lock valve in communication with the first hydraulic motor and configured to selectively block fluid movement through the fluid path of the motor.

In another aspect, the disclosure relates to a pivoting support assembly with a selective position locking capability. The assembly may comprise a base, a first support arm movable with respect to the base; a first pivot joint pivotally mounting the first support arm to the base and a first position locking assembly configured to lock a selected position of the first support arm with respect to the base. The first position locking assembly may comprise a first extensible actuator located at the first pivot joint and having a first fluid port and a second fluid port, with the first extensible actuator being mounted on the base and the first support arm in a manner such that locking the first extensible actuator against extension and retraction resists movement of the first support arm with respect to the base, a fluid path being defined between the first and second fluid ports. The assembly may also comprise a first lock valve in fluid communication with the first extensible actuator and configured to selectively block fluid movement through the fluid path between the first and second ports.

In still another aspect, the disclosure relates a pivoting support assembly with a selective position locking capability. The assembly may comprise a base, a first support arm pivotable movable with respect to the base, and a first pivot joint pivotally mounting the first support arm to the base such that the first support arm and base pivot with respect to each other about a first pivot axis; The assembly may also comprise a first position locking assembly configured to lock a selected position of the first support arm with respect to the base. The first position locking assembly may comprise a first plurality of discs located at the first pivot joint and secured to the first support arm to rotate with the first support arm about the first pivot axis, and a second plurality of discs located at the first pivot joint and secured to the base to rotate with the base about the first pivot axis. The first plurality of discs and the second plurality of discs may be stacked in a substantially alternating manner. The assembly may also comprise a pressure assembly configured to press the first and second plurality of discs together to resist rotation of the first and second pluralities of disks with respect to each other to resist rotation of the first support arm with respect to the base. The assembly may further comprise a pressure release assembly configured to at least partially release pressure from the first and second pluralities of discs to permit rotation of the first plurality of discs with respect to the second plurality of discs to permit rotation of the first support arm with respect to the base.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, as well as the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
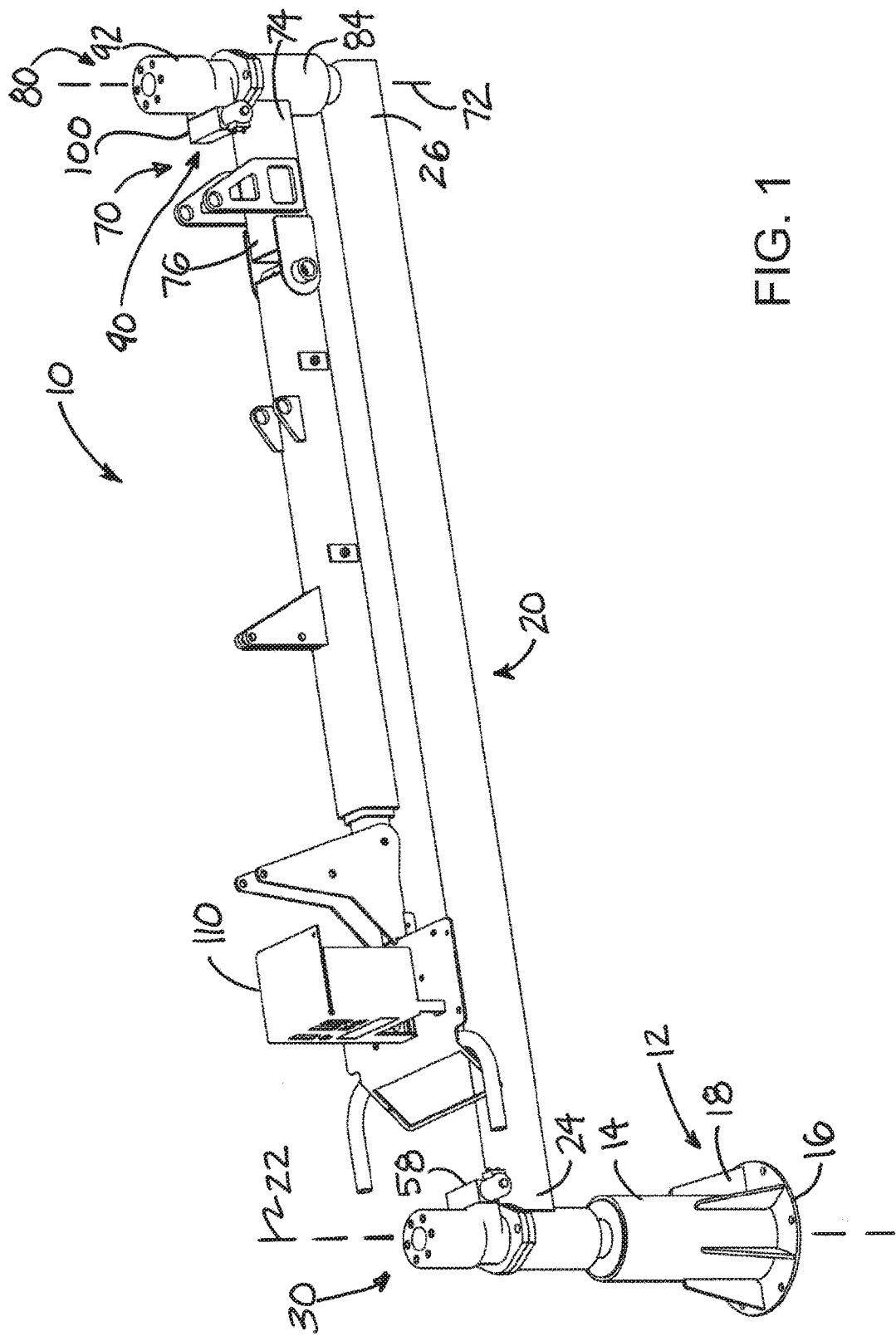
FIG. 1 is a schematic perspective view of portions of a new pivoting support assembly according to the present disclosure.
Figure 2:
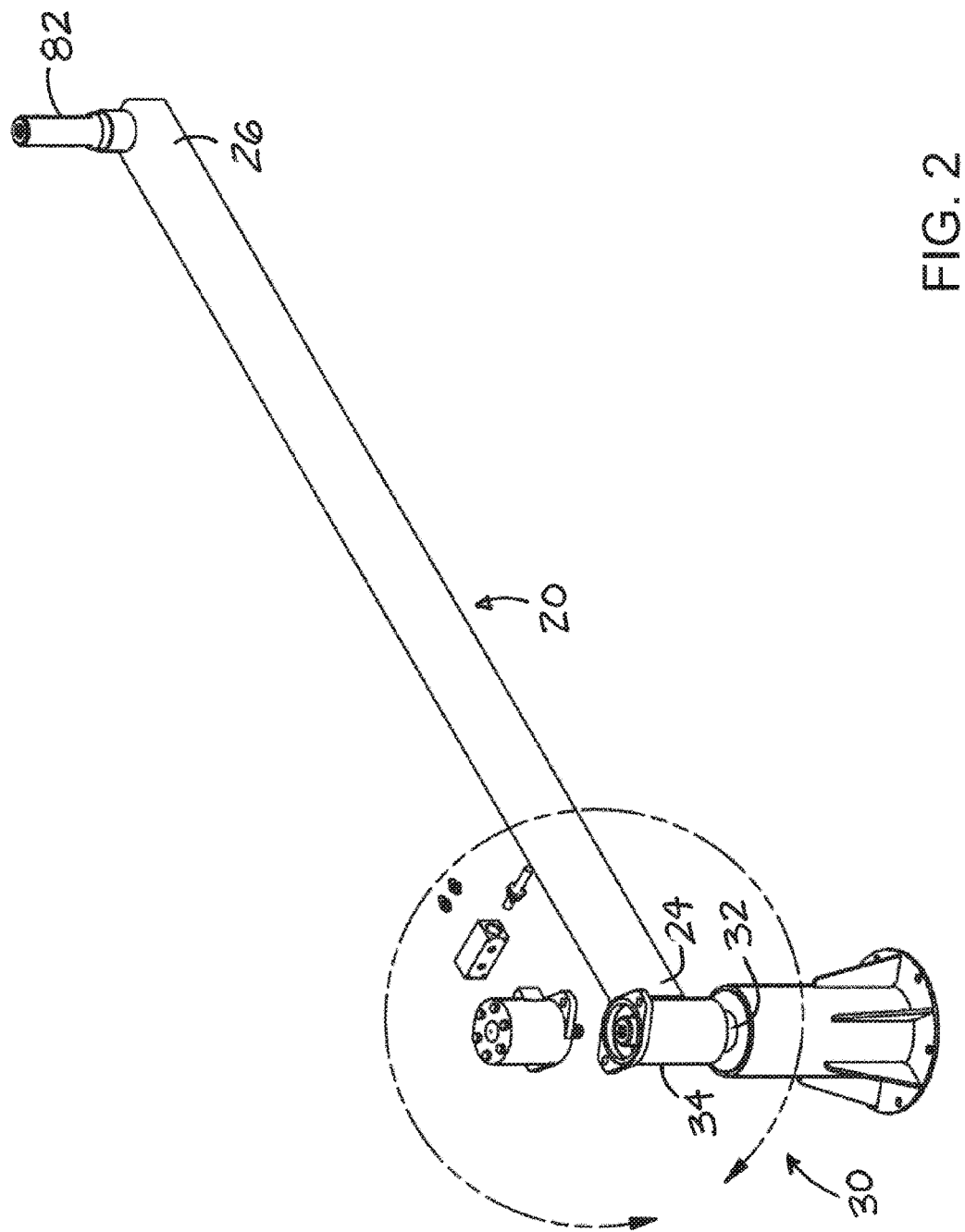
FIG. 2 is a schematic perspective view of a portion of the support assembly with portions exploded to show detail, according to an illustrative embodiment.
Figure 3:
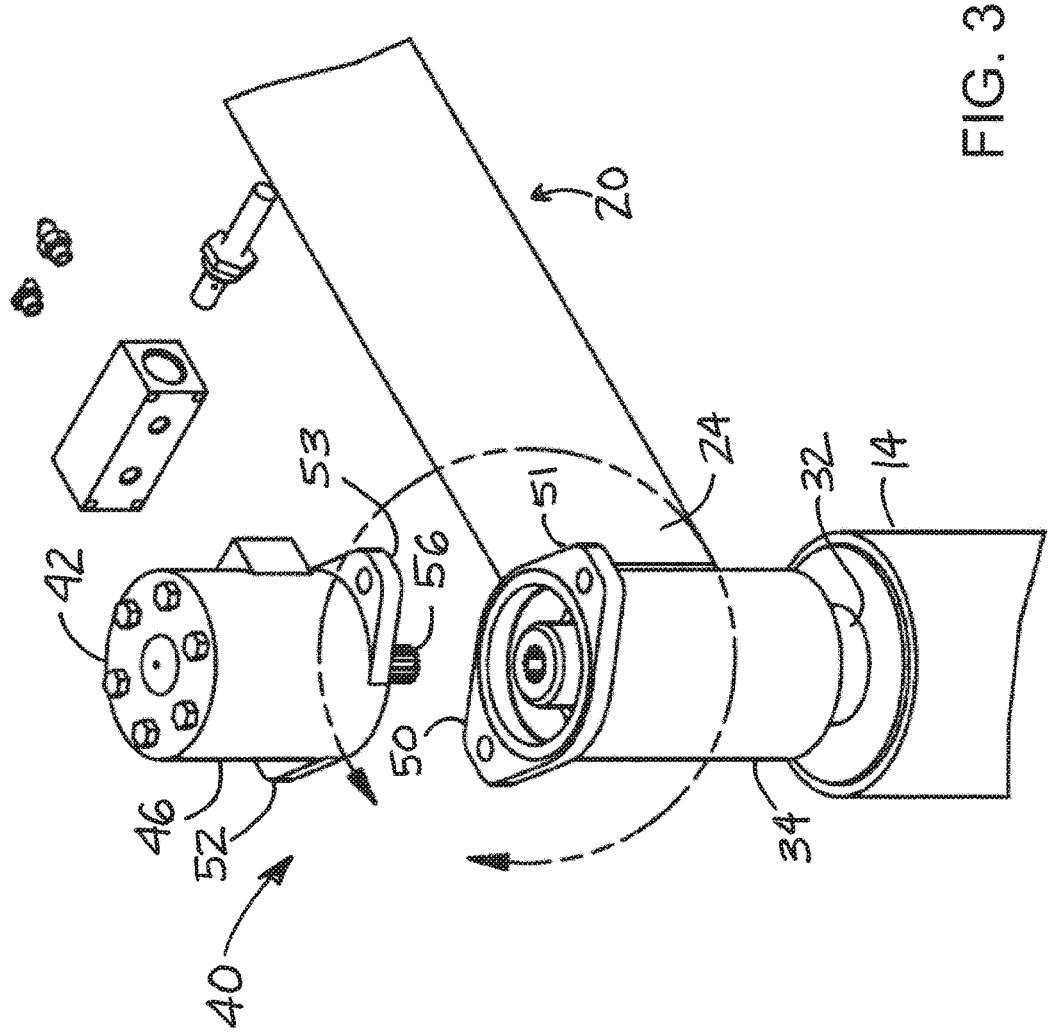
FIG. 3 is a schematic perspective view of an enlarged portion of the support assembly shown in FIG. 2 with portions exploded to show detail, according to an illustrative embodiment.
Figure 4:
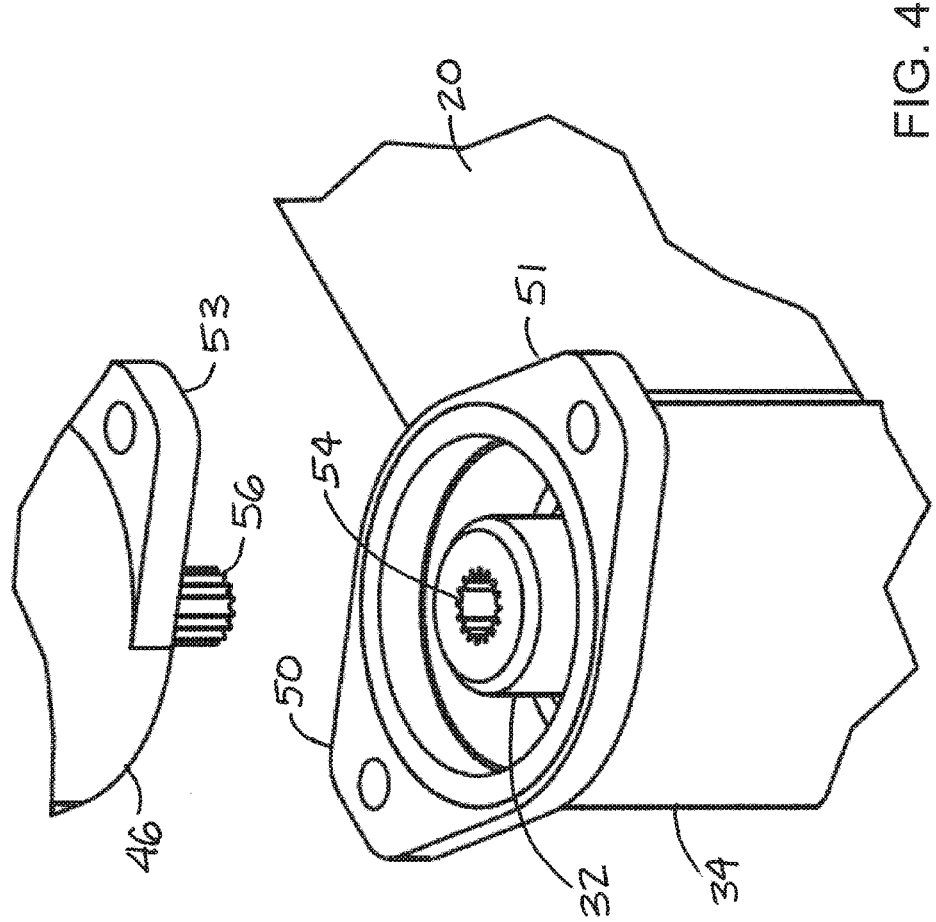
FIG. 4 is a schematic perspective view of a further enlarged portion of the support assembly shown in FIG. 3 with portions exploded to show detail, according to an illustrative embodiment.
Figure 5:
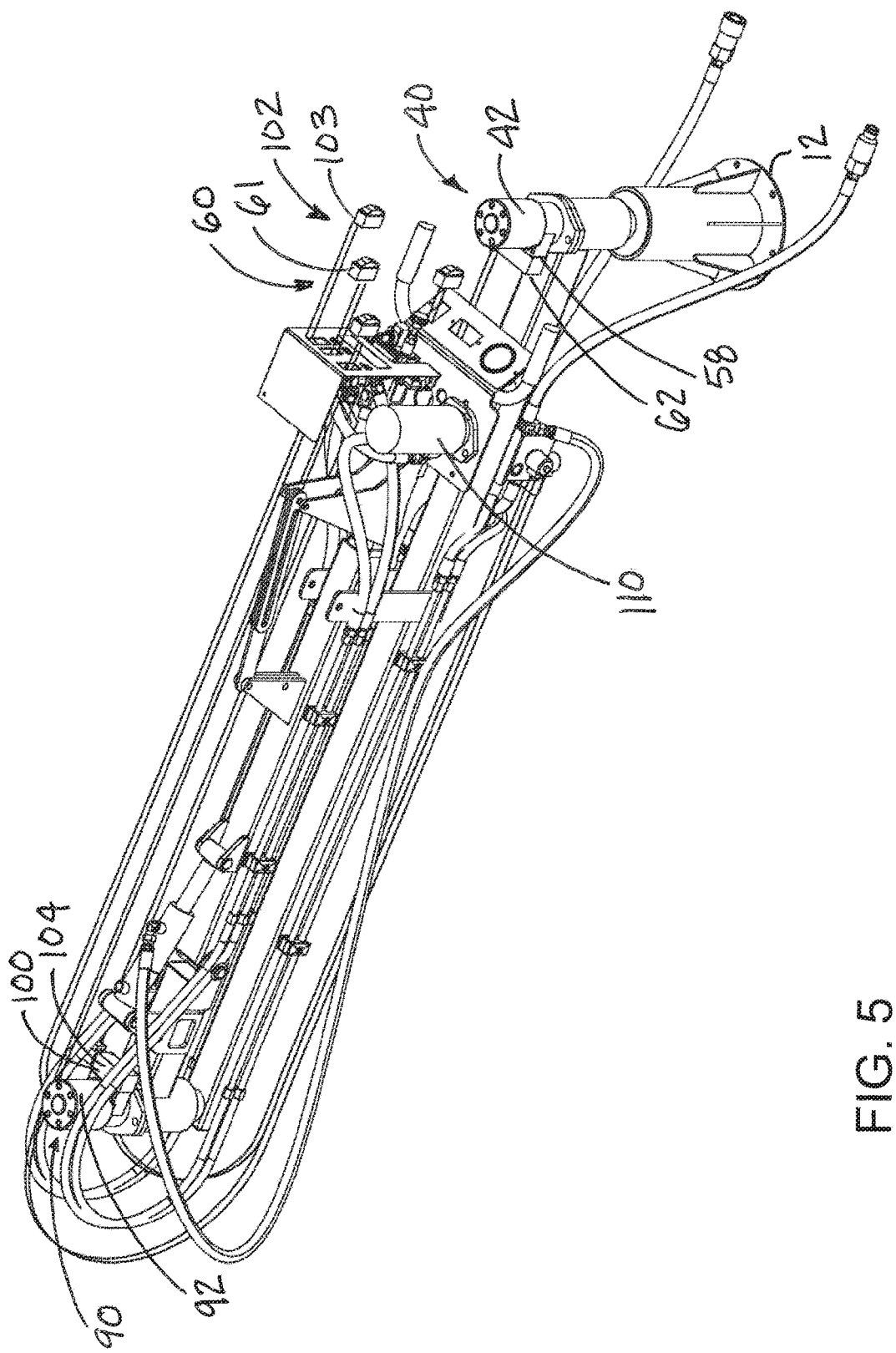
FIG. 5 is a schematic perspective view of the pivoting support assembly with hydraulic and electrical elements included, according to an illustrative embodiment.
Figure 6:
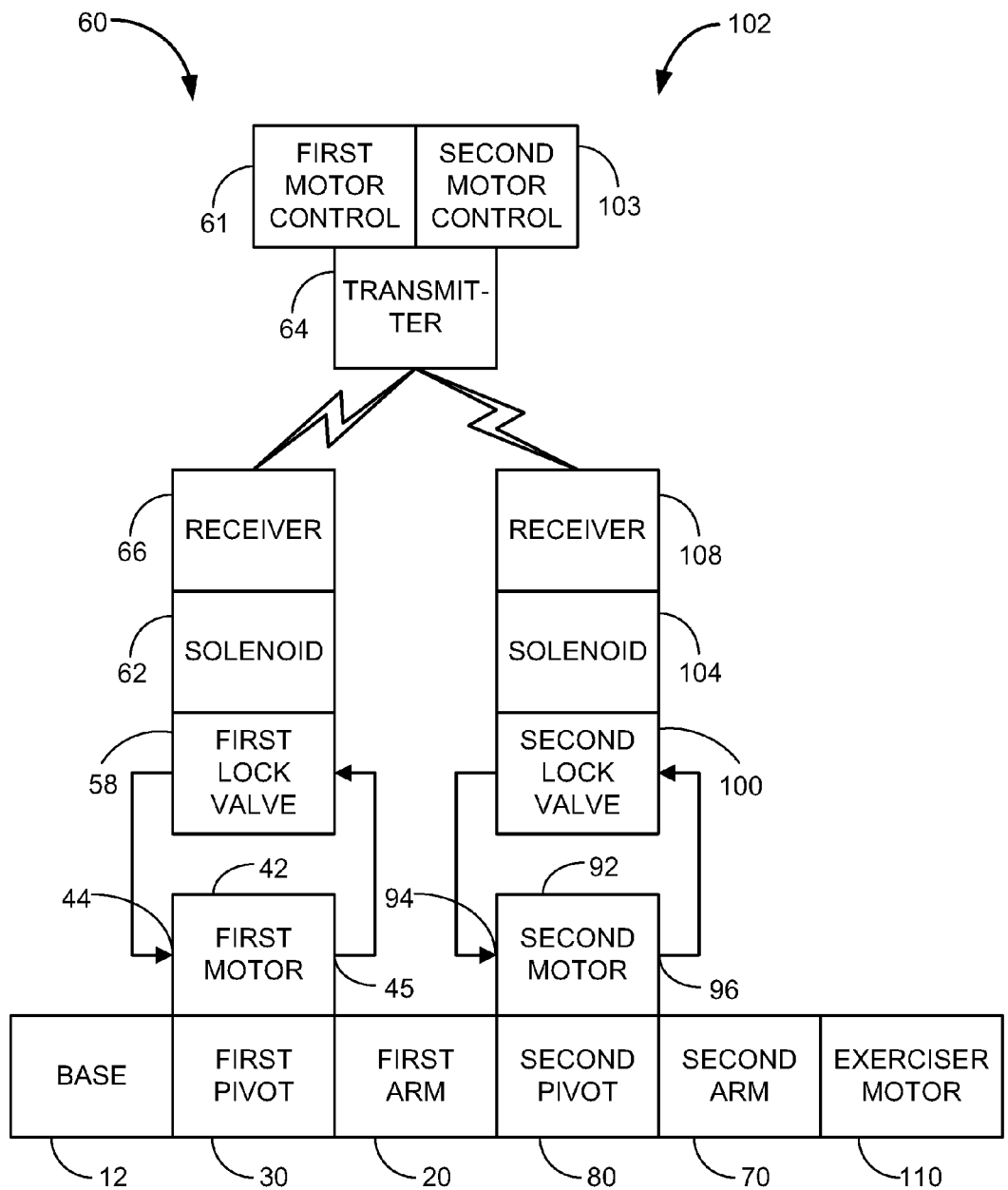
FIG. 6 is a schematic block diagram of a system employing the pivoting support assembly, according to an illustrative embodiment.
Figure 7:
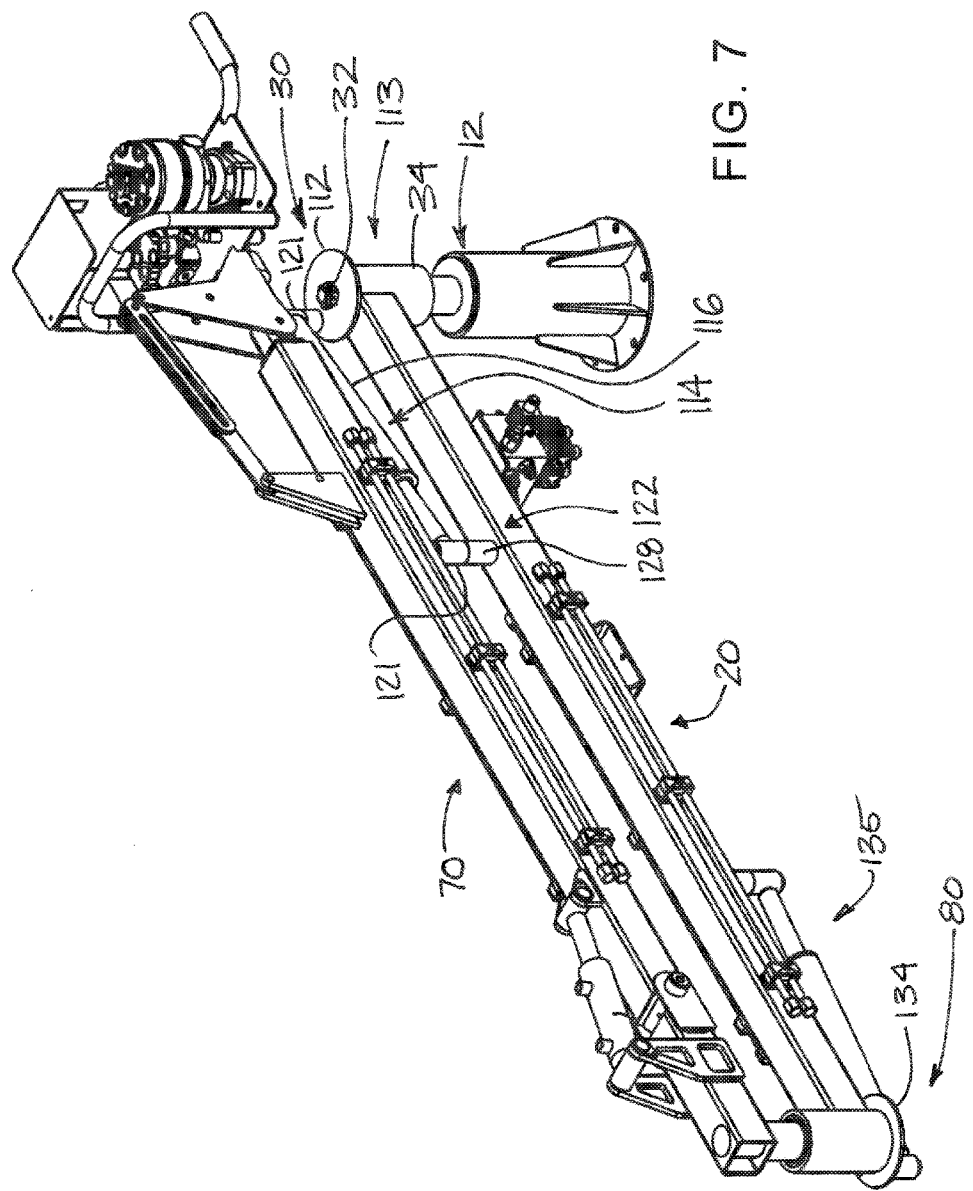
FIG. 7 is a schematic perspective view of another illustrative embodiment of a system employing the pivoting support assembly with various parts removed to reveal detail of the structure.
Figure 8:
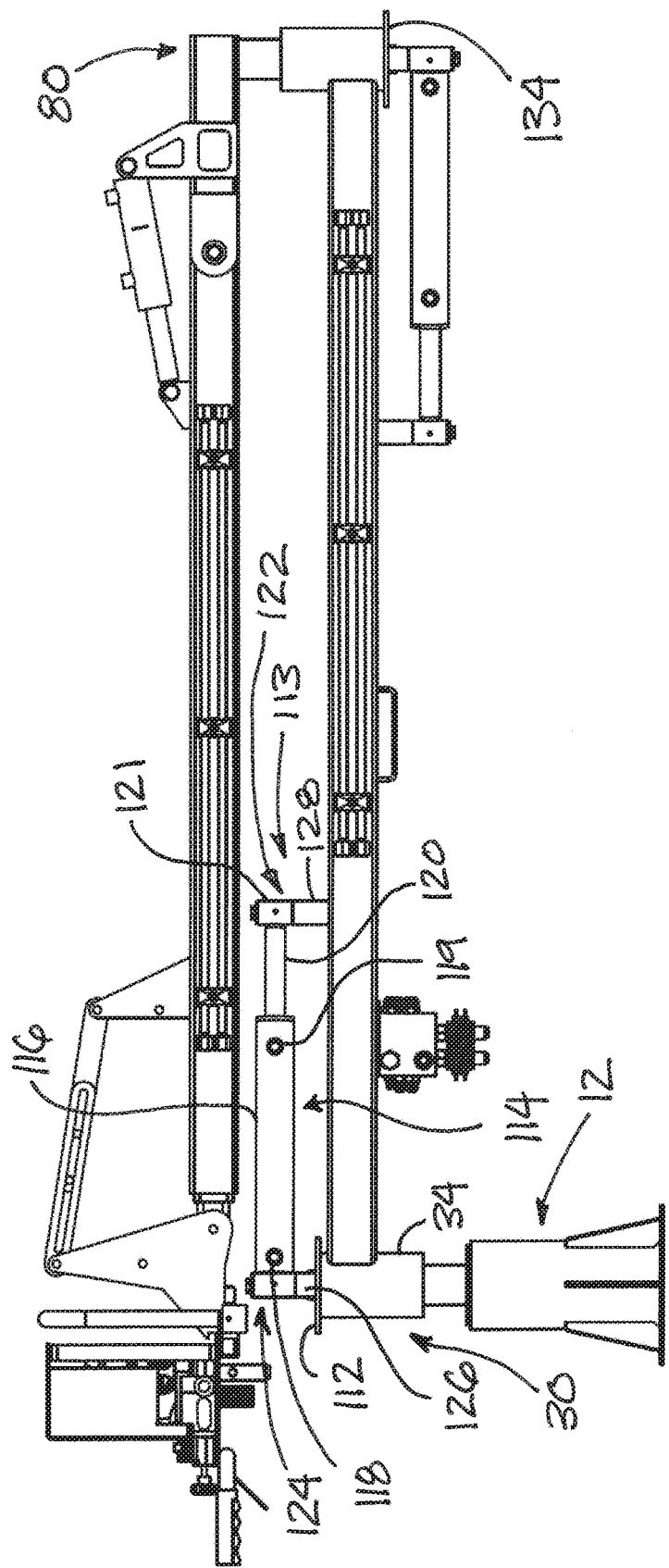
FIG. 8 is a schematic side view of the illustrative embodiment shown in FIG. 7.
Figure 9:
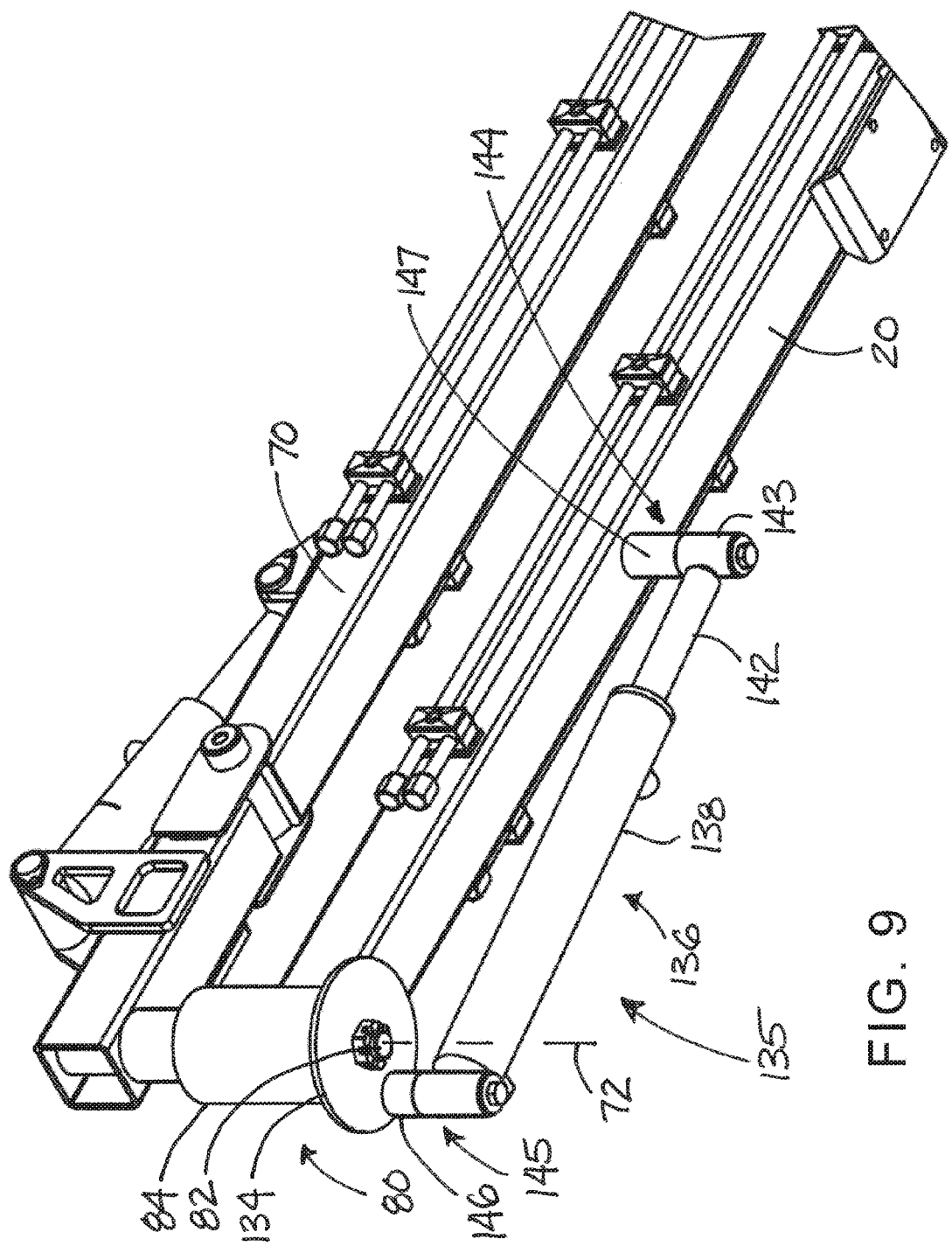
FIG. 9 is a schematic perspective view of a portion of the system shown in FIG. 7 showing detail of the second position locking assembly, according to an illustrative embodiment.
Figure 10:
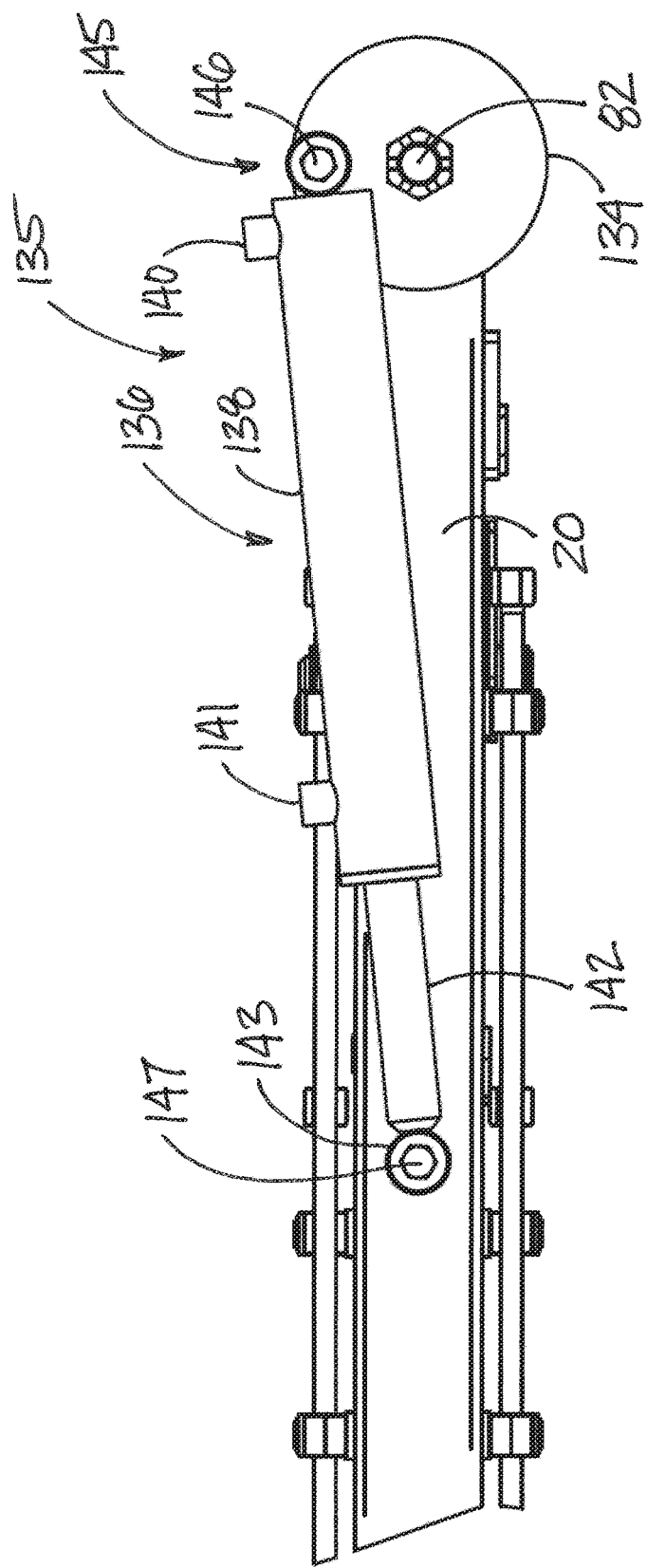
FIG. 10 is a schematic bottom view of the portion of the system shown in FIG. 9, according to an illustrative embodiment.
Figure 11:
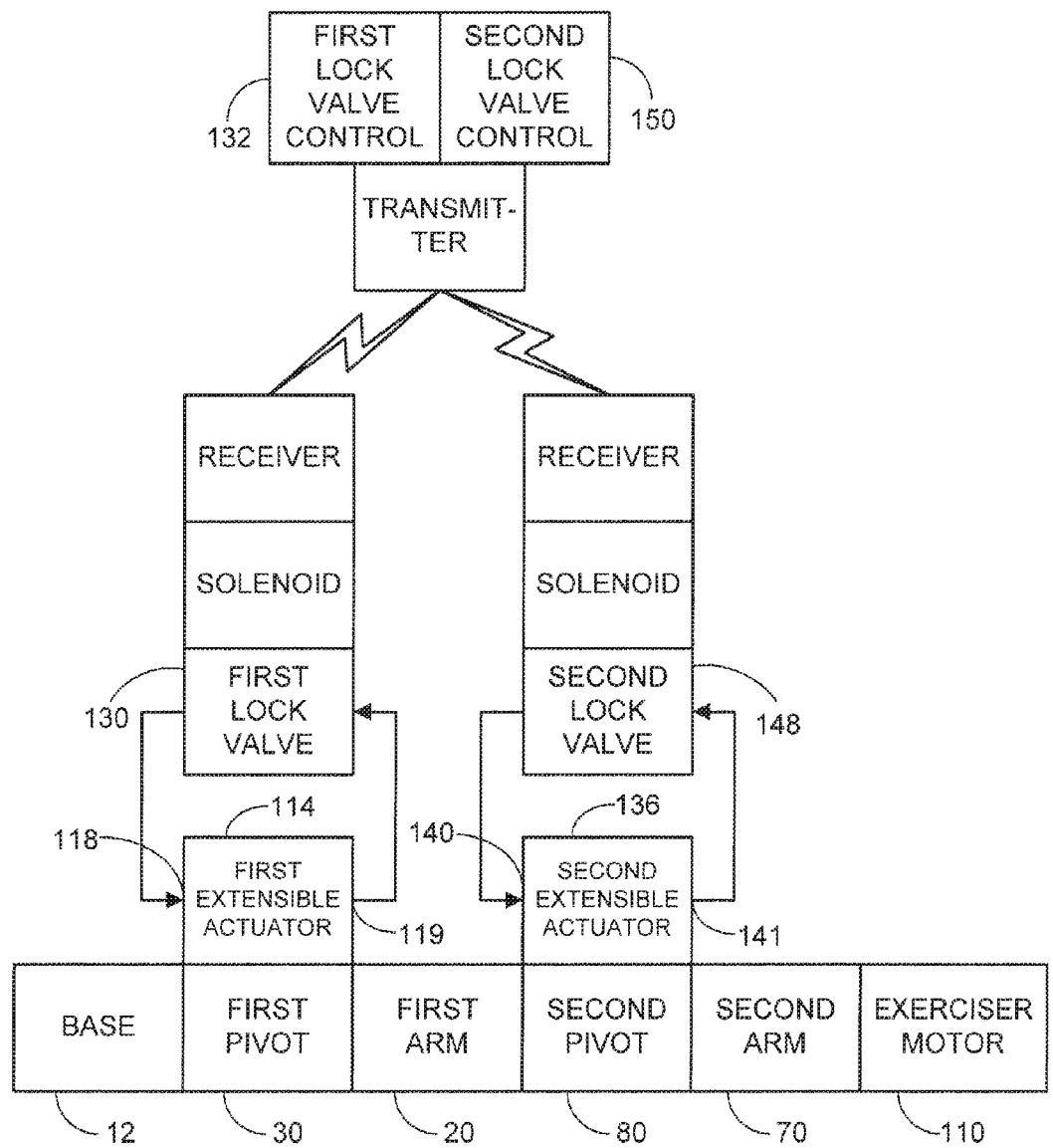
FIG. 11 is a schematic block diagram of a system employing the pivoting support assembly, including another illustrative embodiment of the position locking assemblies.
Figure 12:
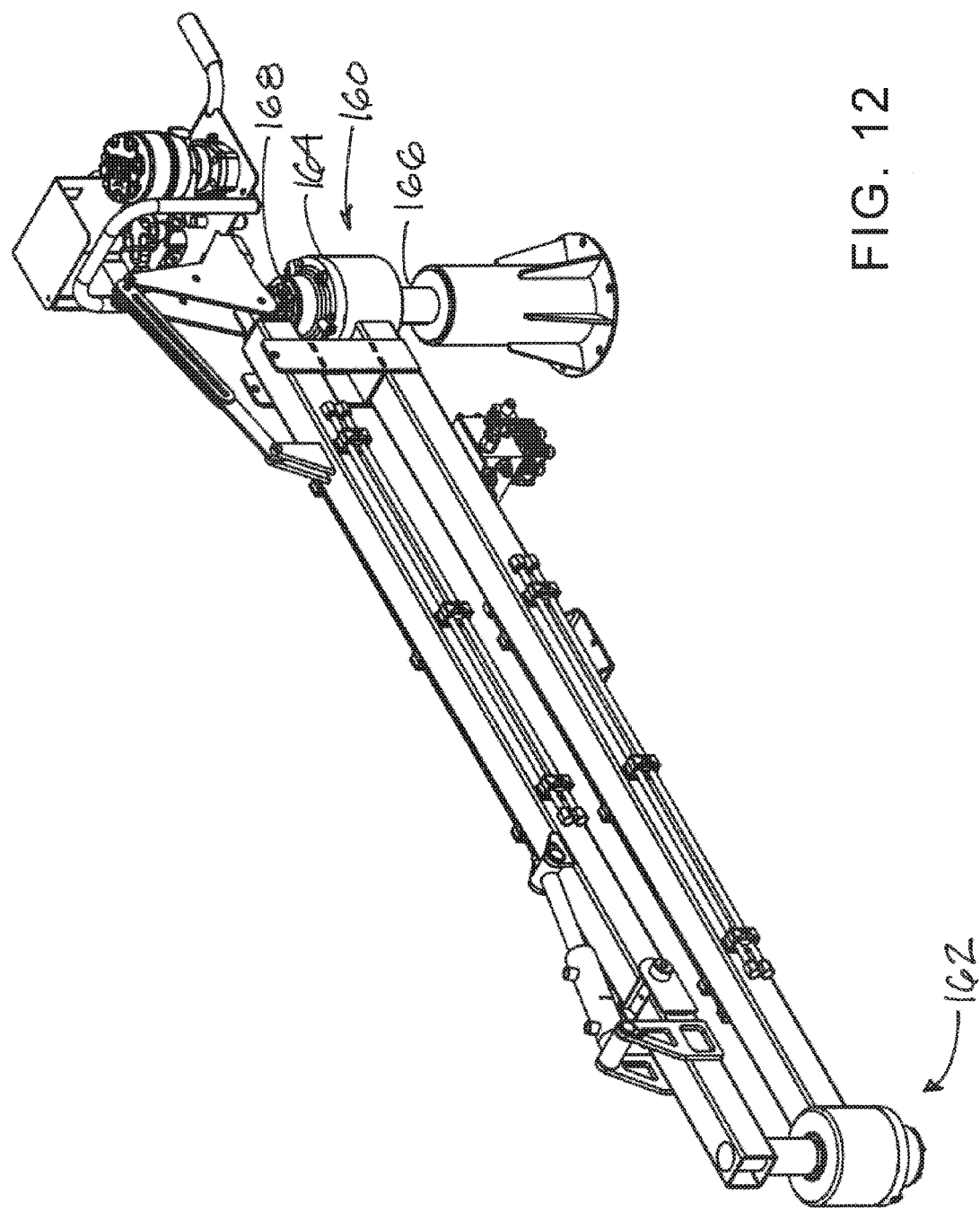
FIG. 12 is a schematic perspective view of yet another illustrative embodiment of a system employing the pivoting support assembly with various parts removed to reveal detail of the structure.
Figure 13:
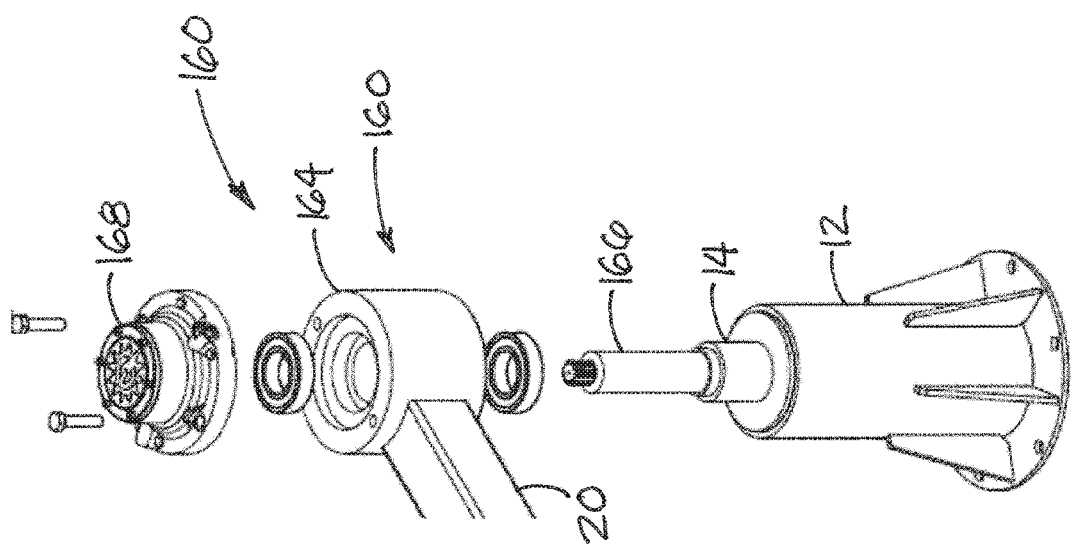
FIG. 13 is a schematic partial perspective view of the illustrative embodiment shown in FIG. 12.
Figure 14:
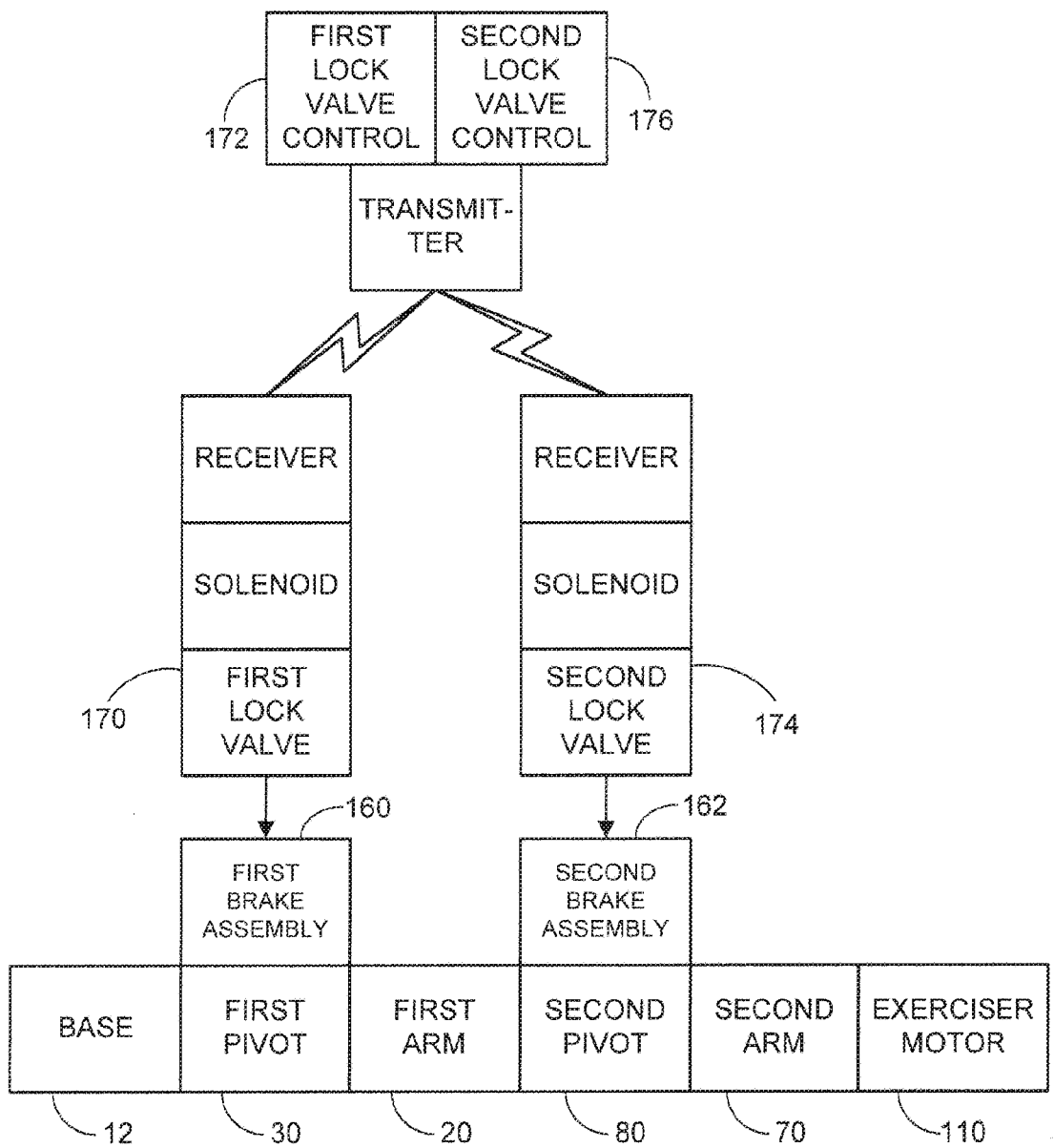
FIG. 14 is a schematic block diagram of a system employing the pivoting support assembly, including another illustrative embodiment of the position locking assemblies.

With reference now to the drawings, and in particular to FIGS. 1 through 14 thereof, a new pivoting support assembly embodying the principles and concepts of the disclosed subject matter will be described.

The applicant has recognized that while brakes, and in particular brakes including a disk and caliper acting on the disk, have been effectively utilized to selectively hold the position of pivoting elements (such as a support arm with respect to a base or with respect to another arm on which the support arm is mounted), such disc and caliper brake structures often suffer from a number of drawbacks. One significant drawback recognized by the applicant is that the caliper of the brake structure requires hydraulic power or pressure in order to "brake" or hold the disc against rotation with respect to caliper, and when hydraulic pressure is no longer supplied to the brake structure, the disc is no longer held and is thus unrestrained against rotation with respect to the caliper. The disc and caliper brake structure is therefore unable to lock the pivoting elements on which the brake structure is mounted against movement, and fails to provide "failsafe" operation of locking the elements against rotation when hydraulic pressure is no longer applied. The disk and caliper brake structure is thus unable to secure the elements when hydraulic pressure is lost unexpectedly through equipment failure or when the power creating the hydraulic pressure is simply turned off after operation of the associated apparatus is completed. Auxiliary locking structures must thus be provided for securing the pivotable elements when the associated apparatus is not being operated but is being transported or stored and pivot movement is undesirable.

A further disadvantage of the disc and caliper brake structure is the hoses and valves required to provide hydraulic power to the disc and caliper structure as well as provide control of the disc and caliper structure, which add cost and complexity to the associated apparatus, particularly is the disc and caliper structure is remotely located from either the hydraulic power source or the controls or both. For example, in the case of a pivotable support arm or arms, hydraulic fluid supply lines need to be run along the lengths of support arms as well as bridge across pivoting joints between the arms. These necessary fluid lines can greatly increase the complexity of manufacture, maintenance, as well as the expense involved in the manufacture and ultimate price of the associated apparatus. Moreover, pressurized hydraulic fluid always has the potential for causing leaks in the supply hoses which can be hazardous and necessitate a repair.

A still further disadvantage of using a disc and caliper brake structure to selectively hold a support arm in position is the inherent resistance between the friction pads utilized on the caliper and the surface of the disc even when hydraulic pressure is not being applied to the caliper to hold the position of the disc with respect to the caliper. Moreover, the surface of the iron or steel disc in inevitably exposed to moisture when the associated apparatus is employed outdoors, and thus rust may form on the surface of the disc, particularly during periods of non-use of the apparatus when the brake pad is unable to slough the rust off of the disc surface. Moreover, periodic replacement of the brake pads on the caliper is necessary to remain effective, which adds an additional maintenance element to the structure.

The applicant has recognized that would be advantageous to provide selective braking of the pivot movement of a support arm with respect to a base or another support arm that minimizes if not eliminates these disadvantages of the conventional disc and caliper brake structure, particularly if the replacement structure is simpler to manufacture and maintain and operate than the disc and caliper structure.

The applicant has thus devised a locking structure that is particularly effective in locking the position of pivoting elements with respect to each other, while providing advantages such as, for example, less manufacturing complexity, less maintenance, and thus lower costs, while also providing the functional improvements such as, for example, the capability of locking the pivoting elements in position with respect to each other even when the associated apparatus is powered down and not being operated.

The applicant has thus devised a locking structure for a support arm that utilizes a hydraulic motor (or pump) and the inherent ability of the hydraulic motor to permit or prevent rotational movement of the shaft of the hydraulic motor depending upon the free movement of hydraulic fluid through the motor. For example, one element of the hydraulic motor, such as the housing of the motor, may be fixed with respect to a base or a support arm, while another element of the hydraulic motor, such as the rotor and connected shaft, may be mounted to a support arm to provide a selective locking capability between the base or support arm and the movable support arm at a rotational or pivotable joint.

The disclosure is thus directed in some aspects to a pivoting support assembly 10 which has a selective position locking capability provided to selectively resist or prevent movement of elements of the support assembly with respect to each other. An illustrative support assembly 10 may include a base 12 which may be mounted on or supported on any suitable structure, and may comprise a mobile base which is readily moved across the ground surface, such as a towable trailer or a vehicle with a prime mover. Optionally, the base 12 may be relatively stationary. In some embodiments, the base 12 includes a post 14 which may extend substantially vertically, but in other embodiments may extend substantially horizontally. The base may also include a base plate 16, and the post 14 may extend from the base plate such as in an upward direction. The base plate 16 may extend in a plane that is oriented perpendicular to an axis of the post, and illustratively the base plate may extend in a substantially horizontal plane oriented perpendicular to the substantially vertically oriented post. Optionally, a plurality of gussets 18 may extend between the post 14 and the base plate 16 in order to support and reinforce the connection between the post and base plate. It should be recognized that in some embodiments the base may be a movable element, such as a base arm.

The supporting assembly 10 may also include a first support arm 20 which may be movable with respect to the base 12. The first support arm may be pivotable with respect to the base, and may be pivotable with respect to the base about a first pivot axis 22. In some embodiments, the first pivot axis 22 is substantially vertically oriented, and the first support arm 20 is movable or pivotable in a substantially horizontal plane, although other orientations may be employed. The first support arm 20 may have a first inboard end 24 and a first outboard end 26, and the inboard end 24 may be positioned adjacent to the base while the outboard end 26 may be located relatively remote to the base. The support assembly 10 may also include a first pivot joint 30 which pivotally mounts the first support arm 20 to the base 12, and may be located at the first inboard end 24 of the first support arm. In some embodiments, the first pivot joint 30 may include a first spindle 32 and a first collar 34 which receives the first spindle. The first spindle 32 may be mounted on the base 12 and the first collar may be mounted on the first support arm, although in some embodiments the mounting of the spindle 32 and the collar 34 on the base and arm may be reversed.

The support assembly 10 may also include a first position locking assembly 40 which is configured to lock a selected position of the first support arm 20 with respect to the base. The first position locking assembly may be located at the first pivot joint 30. The first position locking assembly 40 may comprise a first hydraulic motor 42 which located at, and may be mounted on, the first pivot joint 30. The first hydraulic motor 42 may have a fluid input 44 and a fluid output 45 with a fluid path defined between the input 44 and the output 45. In some embodiments, the first hydraulic motor may comprise a housing 46 and a rotor with the rotor being rotatable relative to the housing. The fluid path may be characterized by the functionality that fluid movement on the fluid path between the input 44 and output 45 tends to operate the first hydraulic motor and may cause the rotor to rotate with respect to the housing 46 (or at least may apply torque to the rotor that tends to rotate the rotor with respect to the housing). Conversely, the prevention of fluid movement along the fluid path through the motor 42 may prevent the motor from being operated, such as preventing the rotor from being able to rotate with respect to the housing.

The housing 46 may be fixed to one element selected from the base element and the first support arm element, and the rotor may be fixed to the other element selected from the base element and the first support arm element. In some embodiments, the housing 46 may be fixed to the first support arm 20 while the rotor may be fixed to the base 12. Illustratively, the housing 46 may be fixed to the first collar of the first support arm, and the rotor may be fixed to the first spindle of the base 12 although other arrangements may be utilized. The first collar 34 of the support arm may have at least one first mount ear 50, 51 which is configured to be fastened to at least one mount ear 52, 53 on the housing 46 of the first hydraulic motor. Further, the first spindle 32 may have a bore 54 formed in the ends of the spindle and the rotor of the first hydraulic motor may have an output shaft 56 which is inserted into the bore 54 of the spindle. In some embodiments, the output shaft 56 and the bore 54 may have complementary splines to facilitate rotation of the rotor and the first spindle as a unit with respect to the first collar 34 and the first support arm.

The support assembly 10 may also include a first lock valve 58 which is in communication with the first hydraulic motor 42 of the first position locking assembly. The first lock valve 58 may be configured to selectively block fluid movement through the fluid path of the motor 42. The first lock valve 58 may have a movement condition which permits substantially free flow of fluid through the fluid path of the first fluid motor, and a lock condition which resists free flow of the fluid through the fluid path of the first fluid motor. The movement condition may correspond to a substantially open condition of the first lock valve 58 and the lock condition may correspond to a substantially closed condition of the first lock valve. The first lock valve 58 may be in fluid communication with the fluid input 44 and fluid output 45 of the first hydraulic motor 42 and a lock valve 58 may be fluidly connected to the fluid input and fluid output.

The movement of the first lock valve 58 to the lock condition may resist or prevent movement of the fluid through the flow path of the first hydraulic motor, and thus the rotation of the rotor and the output shaft with respect to the housing, and may thus resist or prevent the rotation of the collar with respect to the spindle, and by extension, rotation of the first support arm with respect to the base. Conversely, movement of the first lock valve to the movement condition the may allow or permit movement of the fluid through the flow path of the first hydraulic motor, and thus the rotation of the rotor and the output shaft with respect to the housing, and may thus permit rotation of the collar with respect to the spindle, and by extension, rotation of the first support arm with respect to the base. In the movement condition, rotation of the first support arm with respect to the base is not resisted when a rotational force is applied to the first support arm, such as, by example, when the operator pushes on the first support arm at a location that is spaced from the first pivot axis. Free rotation of the first support arm may permit adjustment of the position of the first support arm to the desired orientation, and then the first lock valve may be moved to the lock condition to secure the first support arm in the desired position until the valve is again moved to the movement condition.

The first position locking assembly 40 may also include a first control 60 which is configured to actuate the first lock valve 58 between the movement condition and the lock condition. The first control 60 may have a control switch 61 with a movement position in which the first lock valve is in the movement condition and thus presents minimal resistance to fluid flow along the fluid path (and a lock position in which the first lock valve is in the lock condition) and presents a substantial if not complete blockage of movement of fluid along the fluid path. In some embodiments, the first control 60 may comprise an electrically operable device, and an electrically operable device may for example comprise a solenoid 62. The first control 60 may also comprise a remotely operable device, and the remotely operable device may comprise a transmitter 64 and a receiver 66 with the receiver being interfaced to the solenoid or other element of the first control such that receipt of a suitable wireless signal by the receiver solenoid causes the solenoid to move or be moved between the movement position and the lock position. Optionally, the communication between the control switch 61 and the valve 58 may be through a wired connection. It should be recognized that the operation of the first lock valve 58 may be accomplished manually as well, or permit both electrical operation and manual operation.

In some implementations of the support assembly 10, a second support arm 70 may be utilized which is movable with respect to the first support arm. The second support arm 70 may be pivotable with respect to the first support arm, and may be pivotable about a second pivot axis 72 with respect to the first support arm. The second pivot axis 72 may be substantially vertically oriented and the second support arm may thus pivot in a substantially horizontal plane. The second support arm may have a second inboard end 74 and a second outboard end 76, with the second inboard end 74 being mounted on the first support arm in some embodiments. A second pivot joint 80 may pivotally mount the second support arm to the first support arm, and may mount the second inboard end 74 of the second support arm to the first outboard end 26 of the first support arm. The second pivot joint 80 may comprise a second spindle 82 and a second collar 84 which receives the second spindle. The second spindle may be mounted on the first support arm and the second collar may be mounted on the second support arm.

A second position locking assembly 90 may be configured to lock a selected position of the second support arm 70 with respect to the first support arm 20, and may be located at the second pivot joint 80. The second position locking assembly 90 may be similar or substantially identical to the first position locking assembly 40, and may include a second hydraulic motor 92 which is mounted on the second pivot joint, which may have a fluid input 94 and a fluid output 96 with a fluid path defined between the input and output such that fluid movement on the fluid path between the input and output is capable of operating the hydraulic motor. The second hydraulic motor 92 may be of similar configuration to the first hydraulic motor with similar or identical rotor and housing as disclosed herein. The second position locking assembly 90 may also include a second lock valve 100 which is in communication with the second hydraulic motor 92 and is configured to selectively block fluid movement through the fluid path through the motor 92, and the valve may have a movement condition which permits substantially free flow of fluid through the fluid path of the second fluid motor and a lock condition which resists free flow of fluid through the fluid path of the motor 92. The second lock valve may be operated in a manner similar to the first lock valve to selectively lock and unlock the second support arm to permit movement of the second support arm with respect to the first support arm when the second lock valve is moved into the movement condition, and resist movement when the second lock valve is moved to the lock condition.

The second position locking assembly 90 may also include a second control 102 which may be configured to actuate the second lock valve 100 between the movement and lock conditions. Similar to the first control 60, a second control switch 103 of the second control 102 may have a movement position in which the second lock valve is in the movement condition and a lock position in which the second lock valve is in the lock condition. The second control 102 may comprise an electrically operable device, and may include a solenoid 104 acting on the lock valve 100, and may be remotely operable utilizing a transmitter and a receiver. In some embodiments, the transmitter may comprise a transmitter 64 which also is associated with the first control 60, and is also capable of transmitting to receiver 108 which is associated with solenoid 104. Optionally, a separate and distinct transmitter may be utilized for the second control 102. In some embodiments, the valves 58, 100 may be separately operable of each other so that one pivot joint may be locked independently of the other pivot joint, and at separate times, while the joints may be locked substantially simultaneously if desired.

In some embodiments, the movement condition of the lock valves may provide some degree of resistance to fluid movement through the valve, and thus slow the flow of fluid through the associated motor, to provide a degree of resistance to movement of the elements connected by the associated pivot joint and facilitate smooth movement of the elements with respect to each other.

It may be recognized that in addition to providing a lock capability for one or more of the pivot joints, the motor or motors associated with the pivot joints may also be utilized to actively operate the joints and pivot the respective elements connected at the pivot joint with respect to each other into a desired orientation. However, utilizing the locking motors to actuate and actively operate the joints requires hydraulic fluid supply lines to extend between the controls and the motors or at least from a hydraulic fluid supply. In contrast, selectively blocking flow through the motor or motors at the joints provides a relatively passive braking system that does not require active hydraulic pressure or power.

An illustrative system utilizing the support assembly 10 may include a tool mounted on the first support arm 20 or the second support arm 70. In an illustrative application, the system may comprise a motor, such as a hydraulic motor, for operating a valve such as an underground valve utilized to control the flow of water or other liquids through a supply network. The hydraulic motor may be mounted directly on the second support arm, or may be mounted on additional structure linking the motor to the second support arm, and such structure may include pivot joints and telescoping elements. In such applications, the controls for the motor of the tool 110 as well as controls associated with the first and second position locking assemblies may be located at an end of the structure such as at the motor. Those skilled in the art will appreciate various other configurations that may be possible.

Other embodiments of position locking assemblies may be suitable for selectively locking or securing the positions of the various elements with respect to each other, such as the embodiments shown in in FIGS. 7 through 11. In the embodiments, the first pivot joint 30 may include a first offset member 112 which is mounted on one element of the base 12 and the first support arm 20, and thus may be mounted on one element of the first spindle 32 and the first collar 34 of the first pivot joint in those embodiments which employ the spindle and collar configuration. In the illustrative embodiments, the first offset member 112 may be mounted on the spindle 32 to rotate as a unit with the spindle 32 and thus rotate with respect to the collar 34, and may effectively be mounted on the base 12 in order to rotate with respect to the first support arm 20. The first offset member 112 may extend in a plane that is oriented substantially perpendicular to the first pivot axis 42, and in some embodiments may comprise a plate having a perimeter that may be substantially circular in shape.

The first position locking assembly 113 of the embodiment of FIGS. 7 through 10 may comprise a first extensible actuator 114 located at the first pivot joint 30. The first extensible actuator 114 may be fluid actuatable, such as by a liquid or other flowable substance, although other linear actuators might be employed. The first extensible actuator 114 may have a configuration which is common to hydraulic actuators or "cylinders," with a housing 116 defining a fluid chamber. The actuator 114 may have a first fluid port 118 in communication with the fluid chamber for receiving and expelling fluid from the chamber, and also a second fluid port 119 in communication with the fluid chamber for receiving and expelling fluid from the fluid chamber. The first extensible actuator 114 may have a piston which is positioned in the fluid chamber generally between the first 118 and second 119 fluid ports such that movement of the piston in the fluid chamber causes movement of fluid into and out of the fluid ports, and restriction of fluid movement through at least one of the fluid ports restricts movement of the piston in the fluid chamber. The first extensible actuator 114 may have a rod 120 which extends from one end of the housing and is connected to and movable with the piston. The rod 120 may have a free end 121 which is located opposite of the end of the rod fixed to the piston.

The first extensible actuator 114 may be fixed to the base 12 and the first support arm 20 and effectively across the first pivot joint 30. The first extensible actuator may be mounted on an arm mount point 122 located on the first support arm 20 and an offset mount point 124 located on the base 12. The offset mount point 124 may be located on the first offset member 112. The arm mount point 122 may be located on the first support arm at a location which is spaced longitudinally from the first pivot axis along the first support arm. The offset mount point may be located at a location spaced from the first pivot axis 22 so as to be eccentric with respect to pivot movement of the first support arm with respect to the base.

The housing 116 of the first extensible actuator 114 may be fixed to either the base 12 or the first support arm 20, and the rod 120 of the actuator 114 may be fixed to the other one of the base and the first support arm. Thus, the housing 116 may be fixed to either the arm mount point 122 on the first support arm or the offset mount point 124 on the first offset member 112. In the illustrative embodiments of the present disclosure, the housing 116 is mounted to the first offset member 112 at the offset mount point 124, and may be mounted by an offset mount 126 which permits rotation of the housing 116 with respect to the first offset member 112. In the illustrative embodiments, the rod 120 is mounted to the first support arm at the arm mount point 122 by an arm mount 128 which permits rotation of the rod with respect to the first support arm, although limited rotation or pivot movement may be suitable.

A first lock valve 130 may be in fluid communication with the first extensible actuator and may be configured to selectively block fluid movement through at least one of the first 118 and second 119 fluid ports of the actuator 114, and may be further configured to block fluid movement in a conduit that fluidly connects the first and second fluid ports. The first lock valve 130 may have a movement condition, which may correspond to a substantially open condition of the first lock valve, in which the valve 130 permits substantially free flow of fluid between the first 118 and second 119 fluid ports such that the piston in the chamber of the housing is able to substantially freely move in the chamber, thus permitting substantially free movement of the rod with respect to the housing. The first lock valve 130 may also have a lock condition, which may correspond to a substantially close condition of the first lock valve, in which the valve 130 resists free flow of fluid between the first and second ports, and suitably may prevent any flow out of at least one of the ports 118, 119. Resistance to movement of fluid between the ports effectively prevents movement of the piston in the chamber of the housing which would require fluid to move into and out of the sub chambers of the housing created by the presence of the piston. A first control 132 may be configured to actuate the first lock valve 130 between the movement condition in the lock condition, and the corresponding substantially open and substantially closed conditions. The first control 132 may be actuated in any suitable manner, including using elements and techniques disclosed elsewhere in this disclosure.

In embodiments such as shown in FIG. 7 through 11, the second pivot joint 80 may include a second offset member 134 which is mounted on one element of the first support arm 20 and the second support arm 70, and thus may be mounted on one element of the second spindle 82 and the second collar 84. In the illustrative embodiments, the second offset member 134 may be mounted on the second spindle to rotate with the spindle as a unit and with respect to the second collar, and may effectively be mounted on the second support arm 70 in order to rotate with respect to the first support arm 20. Similar to the first offset member, the second offset member may extend in a plane that is oriented substantially perpendicular to the second pivot access and may comprise a plate which has a perimeter that may be substantially circular in shape.

The second position locking assembly 135 may comprise a second extensible actuator 136 located at the second pivot joint 80. The second extensible actuator 136 may be similar in configuration to the first extensible actuator and may be fluid actuatable. The second extensible actuator may include a housing 138 which defines a fluid chamber with a first fluid port 140 for receiving and expelling fluid and a second fluid port 141 four receiving and expelling fluid. The second extensible actuator 136 may also include a rod 142 which is connected to and movable with a piston positioned in the fluid chamber of the housing. The rod may have a free end 143 which is located opposite of the end of the rod fixed to the piston.

The second extensible actuator 136 may be mounted on the first support arm and the second support arm, and may be mounted on a secondary arm mounting point 144 located on the first support arm and a secondary offset mount point 146 located on the second support arm, or the spindle associated with the second support arm. The secondary offset mount point 144 may be located on the second offset member 134, and the secondary arm mount point 146 may be located on the first support arm at a location that is spaced longitudinally from the second pivot axis along the first support arm. The secondary offset mount point 146 may be located at a location that is spaced from the second pivot axis 80 so as to be eccentric with respect to pivot movement of the second support arm with respect to the first support arm.

The housing 138 of the second extensible actuator may be fixed to either the first support arm or the second support arm, and the rod of the second extensible actuator may be fixed to the other one of the first and second support arms. The housing 138 may be fixed to either of the secondary arm mount point on the first support arm and the secondary offset mount point on the second offset member, In the illustrative embodiments, the housing may be mounted to the second offset member 134 at the secondary offset mount point 145. The housing may be mounted on the second offset member 134 by a secondary offset mount 146 which may permit rotation of the housing of the second extensible actuator with respect to the second offset member. In the illustrative embodiments, the rod 142 of the second extensible actuator may be fixed to the first support arm 20 at the secondary arm mount point by a secondary arm mount 148, which may permit rotation of the rod of the second extensible actuator with respect to the first support arm, although limited rotation or pivot movement may be suitable.

A second lock valve 148 may be in communication with the second extensible actuator 136 and may be configured to selectively block fluid movement through at least one of the fluid ports, and may be configured to block fluid movement between the first and second fluid ports of the second extensible actuator. The second lock valve 148 may have a movement condition, which may correspond to a substantially open condition of the valve, in which the valve 148 permits substantially free flow of fluid between the first and second fluid ports, thus permitting substantially free movement of the piston in the chamber defined by the housing of the second extensible member. The second lock valve 148 may also have a lock condition, which may correspond to a substantially close condition of the second lock valve, in which the valve 148 resists free flow of fluid between the first and second fluid ports, thus effectively resisting movement of the piston in the chamber of the housing of the second extensible actuator. The second lock valve 148 may be in fluid communication with the first and second fluid ports of the second extensible actuator to thereby block and permit fluid movement through in between the first and second fluid ports of the second extensible actuator. Resistance to movement of fluid between the ports 140, 141 effectively prevents movement of the piston in the chamber of the housing which would require fluid to move into and out of the sub chambers of the housing created by the presence of the piston.

A second control 150 may be configured to actuate the second lock valve 148 between the movement condition and the lock condition, and the control may have a movement position in which the first lock valve is in the movement condition and a lock position in which the first lock valve is in the lock condition, similar to the first lock valve and the first control. The second control 150 may be actuated in any suitable manner, including using elements and techniques disclosed elsewhere in this disclosure.

One or more of the position locking assemblies for the system may employ suitable brake assemblies at one or more of the pivot joints of the support assembly. In the illustrative embodiments shown in FIGS. 12 and 13, a first position locking or brake assembly 160 may be positioned at the first pivot joint 30 and a second position locking or brake assembly 162 may be positioned at the second pivot joint 80. For example, the discs may be positioned between the collar 164 and the spindle 166 of the first pivot joint, and some of the discs may be fixed to rotate with the spindle and other discs may be fixed to rotate with the collar. Illustratively, a brake assembly may be employed that utilizes a plurality of discs with some discs of the plurality of discs being secured to rotate, for example, with a spindle of the pivot joint and other discs of the plurality of discs being secured to rotate, for example, with the collar of the pivot joint. The discs may be, for example, wet organic friction plates which are maintained in a fluid bath to help dissipate heat, but dry bronze friction plates may also be employed. One example of such a brake is available as Model 93-110, from Eskridge, Inc. 1900 Kansas City Road, Olathe, Kans. 66061 USA.

In such embodiments, the discs may be stacked such that discs fixed to rotate with the spindle are positioned substantially alternately with discs fixed to rotate with the collar. Pressure applied to the stack of discs in an axial direction (e.g., in a direction parallel to the pivot axis) tends to resist rotation of the discs, and thus the spindle and collar, with respect to each other. The release of the axial pressure tends to permit the discs, and thus the spindle and the collar, to rotate with respect to each other with little or no resistance. As a result, the elements associated with the spindle and the collar, such as the base and the first arm, or the first arm and the second arm, may be locked against rotation relative to each other when axial pressure is applied to the discs and may be released from any lock when the axial pressure is released. In some configurations, the structure applying pressure to the discs may do so in a manner in which the pressure is normally and constantly applied until the pressure is released, providing a "fail safe" locking of the positions of the elements with respect to each other. Other configurations may not have the pressure applied to the discs until released.

Each of the brake assemblies 160, 162 may include a pressure applicator 168 that is capable of selectively applying pressure to release the pressure plate from the discs to permit the groups of discs to rotate with respect to each other and permit rotation of the collar with respect to the spindle. The pressure applicator may include a pressure assembly which is configured to press the discs of the first and second pluralities of discs together to resist rotation of the first and second pluralities of disks with respect to each other to resist rotation of the first support arm with respect to the base. For example, the axial pressure may be applied to the discs by a disc or plate that is pressed against the discs by one or more springs, such as helical compression springs. The pressure applicators may also include a pressure release assembly configured to at least partially release pressure from the first and second pluralities of discs to permit rotation of the first plurality of discs with respect to the second plurality of discs to permit rotation of the first support arm with respect to the base. For example, release of the axial pressure may be accomplished by releasing at least a portion of the pressure applied by the plate. This release, or partial release, may be accomplished by fluid or hydraulic pressure acting on the plate in an axial direction opposite to the pressure applied by the springs. Actuation of the brake assembly may thus be controlled by the supply of hydraulic fluid pressure to the brake through, for example, the opening and closing of a valve through which fluid may be supplied to the assembly. The normal application of mechanical pressure by the springs and plate to the discs may thus be interrupted by hydraulic pressure applied to the plate in opposition to the springs.

A first lock valve 170 may be employed to actuate the pressure applicator of the first brake assembly, such as through a first control 172, and a second lock valve 174 may be employed to actuate the second brake assembly through a second control 176.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps disclosed in the text and/or the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A pivoting support assembly with a selective position locking capability, the assembly comprising;
   a base;
   a first support arm movable with respect to the base;
   a first pivot joint pivotally mounting the first support arm to the base to move about a first pivot axis;
   a first position locking assembly configured to lock a selected position of the first support arm with respect to the base, the first position locking assembly comprising:
      a first extensible actuator located at the first pivot joint and having a first fluid port and a second fluid port, the first extensible actuator being mounted on the base and the first support arm in a manner such that locking the first extensible actuator against extension and retraction resists movement of the first support arm with respect to the base, a fluid path being defined between the first and second fluid ports; and
      a first lock valve in fluid communication with the first extensible actuator and configured to selectively block fluid movement through the fluid path between the first and second ports.

2. The assembly of claim 1 wherein the first lock valve is in communication with at least one of the first fluid port and the second fluid port of the first extensible actuator to block fluid movement through the at least one of the fluid ports.

3. The assembly of claim 1 wherein the first support arm is pivotable with respect to the base about a first pivot axis.

4. The assembly of claim 1 wherein the first position locking assembly is located at the first pivot joint.

5. The assembly of claim 1 wherein the first extensible actuator comprises a housing defining a fluid chamber in communication with the first fluid port and the second fluid port, a piston located in the fluid chamber, and a rod connected to and movable with the piston.

6. The assembly of claim 5 wherein the housing of the first extensible actuator is being fixed to one of the base and the first support arm and the rod of the first extensible actuator is fixed to another one of the base and the first support arm.

7. The assembly of claim 1 wherein the first pivot joint includes a first spindle, a first collar receiving the first spindle, and a first offset member fixed to rotate with the first spindle and with respect to the first collar, an arm mount being located on the first support arm and an offset mount being located on the first offset member at a location spaced from the first pivot axis, the first extensible actuator including a housing and a rod, the housing being mounted on one of the arm mount and the offset mount and the rod being mounted on an other one of the arm mount and the offset mount.

8. The assembly of claim 1 wherein the first lock valve is characterized by having a movement condition permitting substantially free flow of fluid through at least one of the fluid ports on the first extensible actuator and a lock condition resisting free flow of fluid through at least one of the fluid ports on the first extensible actuator.

9. The assembly of claim 8 wherein the movement condition corresponds to a substantially open condition of the first lock valve and the lock condition corresponds to a substantially closed condition of the first lock valve.

10. The assembly of claim 8 wherein the first position locking assembly includes a first control configured to actuate the first lock valve between the movement condition and the lock condition.

11. The assembly of claim 1 additionally comprising a tool mounted on the first support arm such that a position of the tool is movable by movement of the first support arm with respect to the base.

12. The assembly of claim 11 wherein the tool comprises a valve operating device.

13. The assembly of claim 1 additionally comprising a second support arm mounted on and movable with respect to the first support arm, a second pivot joint pivotally mounting the second support arm to the first support arm to move about a second pivot axis, and a second position locking assembly configured to lock a selected position of the second support arm with respect to the first support arm.

14. The assembly of claim 13 wherein the second position locking assembly is located at the second pivot joint.

15. A pivoting support assembly with a selective position locking capability, the assembly comprising;
   a base;
   a first support arm pivotable movable with respect to the base;
   a first pivot joint pivotally mounting the first support arm to the base such that the first support arm and base pivot with respect to each other about a first pivot axis;
   a first position locking assembly configured to lock a selected position of the first support arm with respect to the base, the first position locking assembly comprising:
      a first plurality of discs located at the first pivot joint and secured to the first support arm to rotate with the first support arm about the first pivot axis, a second plurality of discs located at the first pivot joint and secured to the base to rotate with the base about the first pivot axis, the first plurality of discs and the second plurality of discs being stacked in a substantially alternating manner;
      a pressure assembly configured to press the discs of the first and second pluralities of discs together to resist rotation of the first and second pluralities of disks with respect to each other to resist rotation of the first support arm with respect to the base; and
      a pressure release assembly configured to at least partially release pressure from the first and second pluralities of discs to permit rotation of the first plurality of discs with respect to the second plurality of discs to permit rotation of the first support arm with respect to the base.

16. The assembly of claim 15 wherein the first pivot joint includes a first spindle and a first collar receiving the first spindle, the first plurality of discs being secured to the first collar and the second plurality of discs being secured to the first spindle.

17. The assembly of claim 15 wherein the pressure assembly includes a pressure plate exerting axial pressure against the discs of the first and second pluralities of discs, and at least one spring acting on the pressure plate in an axial direction.

\* \* \* \* \*